Feb. 11, 1958

G. E. DIETZ ET AL

2,822,984

CONTROL APPARATUS FOR FLUID FUEL BURNING
APPARATUS AND THE LIKE

Filed June 9, 1952

United States Patent Office 2,822,984
Patented Feb. 11, 1958

2,822,984

CONTROL APPARATUS FOR FLUID FUEL BURN-
ING APPARATUS AND THE LIKE

Gerald E. Dietz and Adolph J. Hilgert, Milwaukee, Wis.,
assignors to Baso Inc., a corporation of Wisconsin Application June 9, 1952, Serial No. 292,488

11 Claims. (Cl. 236—9)

This invention relates, in general, to control apparatus, and has particular relation to control apparatus which is adapted to be powered by a source of small electric energy such as a single thermocouple or a thermopile or the like, and has particular utility in controlling, for example, the flow of fuel for space heaters and the like.

The present invention may be more particularly characterized as relating to improvements in control apparatus powered solely by its own internal source of electric energy such as that provided by a single thermocouple or thermopile or similar source of small electric energy, and provides for electrically and directly operating, for example, a main valve for automatically controlling the flow of fuel to a main burner responsive, for example, to changes in temperature or similar condition.

Apparatus of the aforementioned character provides the desired condition or temperature responsive control without the assistance of fluid pressure and without an external source of electric current. The elimination of the necessity of an external source of electric current permits operation of the apparatus where an external source of electric current is not available or where it has failed and it eliminates dependence on an electric utility for operation of the apparatus. The necessity for an electrician's service in installation is also eliminated and costly and not too dependable electric control components such as transformers and the like are not required. The additional fluid flow controls necessary where the assistance of fluid pressure is required in obtaining the desired control are also eliminated and the apparatus is not subject to leakage or other improper functioning of such additional fluid flow controls.

Moreover, control apparatus of this character has implicit therein a fail-safe aspect in that if the source of small electric energy fails (i. e., if a pilot burner which heats a thermoelectric generator to provide the small electric energy is extinguished), the apparatus automatically shuts off, for example, the flow of fuel to the main burner thereby providing a safety function for the main burner and at the same time affording temperature responsiveness without the necessity of other control devices in the main fuel stream and without the necessity of an external source of electric current.

Apparatus of this character also eliminates the necessity of manually resetting the main valve and the foregoing functions are provided in an all-electric apparatus wherein the main valve is actuated, for example, for controlling the flow of fuel to a main burner electrically and directly from the source of thermoelectric current or similar small electric energy as distinguished from actuation of such a valve through a relay of the diaphragm valve type or electrically by an external source of electric energy.

In the provision of apparatus of the aforementioned character certain basic considerations must be kept in mind. First, the apparatus of the present invention is designed to control the flow of fluid fuel to a main burner of fluid fuel burning apparatus, which necessitates that the valve have sufficient capacity to be usable for this purpose. The capacity of a valve, we have found, is for all practical purposes a function of the product of size or diameter of the valve and the distance which the valve member is removed from the valve seat when the valve is opened, such movement ordinarily being against the sealing force of the valve member, which, in turn, must be sufficient to prevent leakage of the valve when closed. It follows, therefore, that a given amount of work must be done to open a valve of given capacity and that the amount of energy necessary to do such work must not exceed the power available. In apparatus having the features aforementioned, such power is very limited (the output of a thermocouple presently marketed by Baso Incorporated, assignee of the present invention, being under ordinary circumstances in the order of 5.5 milliwatts or about 20 millivolts to a matched load). It is, therefore, necessary to make most efficient use of the power available, and particularly to minimize the inherent inefficiency of electromagnetic valve operators, which as is well known, afford the least amount of force when the armature air gap is greatest, i. e., at the beginning of the stroke, whereas the sealing force applied to the valve member actuated by such operators is the greatest when the valve is closed, i. e., at the beginning of the armature stroke, and diminishes as the valve is "cracked" against fluid pressure and moves to open position.

Accordingly, a primary object of the present invention is to provide an electromagnetically operated valve powered solely and directly from an internally generated source of electrical energy, such as a thermoelectric generator or thermocouple, which valve minimizes inefficiencies in power utilization ordinarily inherent in valves of this character to provide a valve of capacity sufficient to permit use thereof as a fluid flow control means for the main burner of fluid fuel burning apparatus.

More particularly, an object of the present invention is to provide in fluid flow control means of the aforementioned character improved energy storing connections between an armature of electromagnetic operating means and fluid flow control means whereby the force occasioned by actuation of the former is delayed in its application to the latter until the armature air gap of the electromagnetic operator approaches the value where the magnetic attraction of the armature is at a maximum.

Another object is to provide in electromagnetically operated apparatus of the aforementioned character means for maintaining a minimum armature air gap to minimize the effects of residual magnetism therein without use of special, and hence, costly magnetic flux carrying materials.

Another object is to provide in electromagnetically operated fluid flow control apparatus of the aforementioned character means for storing energy during attraction of the armature thereof for utilization in overcoming residual magnetism upon retraction of the armature, and more particularly to provide means of the aforementioned character which will also contribute to maintenance of a minimum armature air gap as aforementioned.

Another object is to provide electromagnetically operated fluid flow control apparatus powered solely and directly from an internally generated source of electric energy as aforementioned which may be controlled by condition responsive means in circuit therewith, and more particularly to provide apparatus of the aforementioned character wherein such condition responsive apparatus may, if desired, be located remotely from the fluid flow control means.

Another object is to provide condition responsive fluid flow control apparatus of the aforementioned character wherein the differential of the apparatus is minimal and independent of mechanical contributions thereby rendering the apparatus extremely sensitive and eliminating need for "anticipating" means, and further to provide such apparatus wherein the condition responsive means may act as a condition responsive variable resistance in the energizing circuit.

Another object is to provide condition responsive fluid flow control apparatus of the aforementioned character wherein the condition responsive means may utilize a condition responsive fill, and which requires so little power as to permit such fill to be subatmospheric thereby rendering the apparatus fail-safe in the event of leakage of such fill.

Another object is to provide in combination with apparatus of the aforementioned character for controlling flow of fluid fuel to a main burner, powered solely and directly from an internally generated source of electric energy, electromagnetic means for controlling flow of such fluid fuel to a pilot burner also powered from said source of electric energy to provide 100% shutoff upon failure of said source of energy.

Another object is to provide in fluid flow control apparatus of the aforementioned character having electrical connections for placement of condition responsive means in circuit therewith means for shorting said connections to render said apparatus merely self-actuating main burner flow control means.

Another object is to provide in fluid fuel flow control apparatus of the aforementioned character electrical connection means permitting conversion of said apparatus from self-actuating main burner flow control means to condition responsive flow control means with the condition responsive means located integrally or remotely therefrom as desired.

Further objects and advantages and numerous modifications and adaptations of the invention will appear from the following detailed description taken in connection with the accompanying drawings.

In the drawings, the numeral 1 indicates a main valve body having a gaseous fuel inlet 2 and a gaseous fuel outlet 3. Contiguous sections of a gaseous fuel supply pipe 4 are connected to the inlet 2 and outlet 3. The section connected to the outlet leads to a main burner 5 (Figure 11) which may be located in the firebox of a space heater or other heater. A pilot burner 6 is located in juxtaposition to the main burner 5 to maintain a pilot burner flame for igniting the main burner. The pilot burner is supplied with gaseous fuel by a pilot burner fuel supply pipe 7 which is connected to the valve body 1 either directly or through a thermoelectric safety shut-off device as will presently appear. The positions of the pilot burner flames are shown in dotted lines.

The delivery of gaseous fuel from the pipe 4 to the burner 5 is preferably by way of a mixing chamber 8 to which air is admitted through adjustable air inlets (not shown) as well understood in the art.

Figures 5, 6, 7:
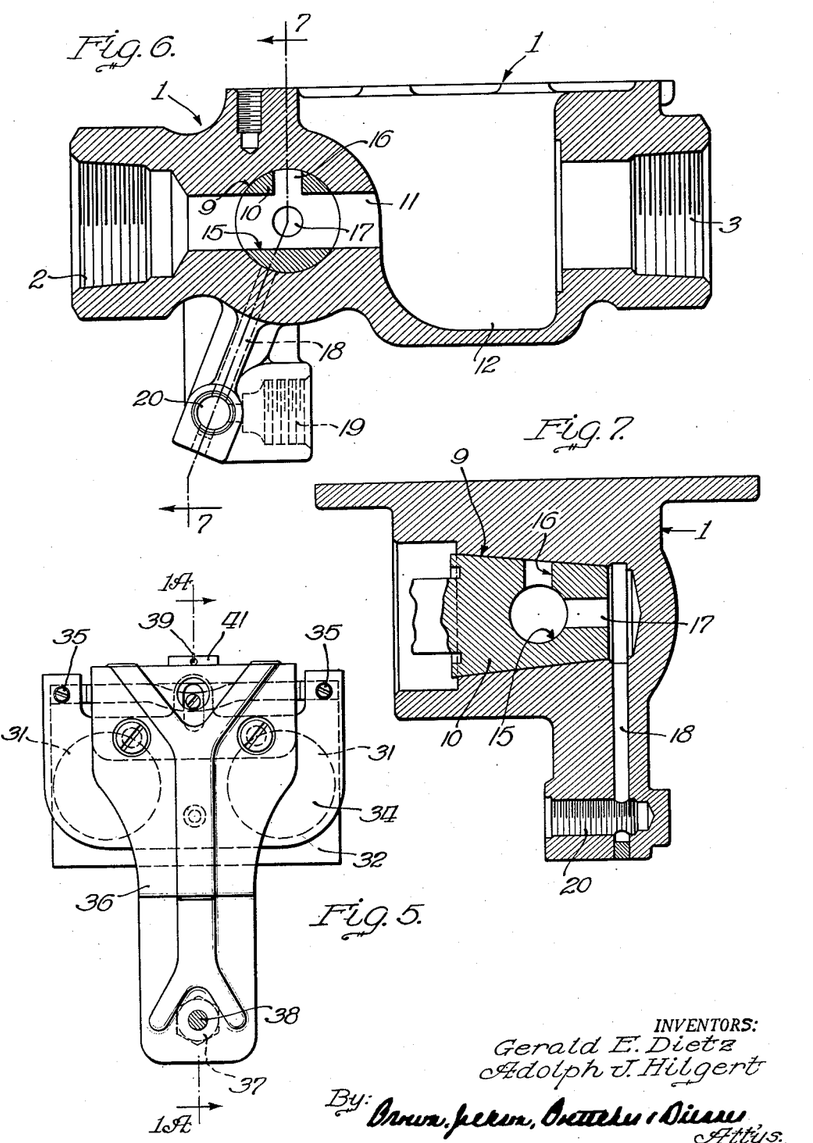
Figure 5 is an end view of the low power automatic operator taken on the line 5—5 of Figure 1.
Figure 6 is a longitudinal sectional view through the valve body taken substantially on the line 6—6 of Figure 2 and with the safety shut-off for the pilot burner removed.
Figure 7 is a sectional view taken on the line 7—7 of Figure 6.

As shown particularly in Figures 6 and 7, the inlet 2 opens into a truncated conical bore 9 in which a truncated conical gas cock or plug 10 is seated for turning movement. A passage 11 opens from the bore 9 into the valve chamber 12 and a main valve member 13 cooperates with a valve seat 14 at the inner end of the outlet 3 to control the flow of fuel to the main burner 5. The plug 10 has a passage 15 opening diametrically therethrough; also a pilot fuel supply passage 16 opening radially from the passage 15 and a second pilot fuel supply passage 17 opening axially inwardly from the passage 15 through the inner end of the plug 10. The passage 17 opens into a passage 18 which is disposed at the back of the control and leads to a fuel outlet 19 for the pilot burner.

The passage 18 may contain a pilot adjustment screw 20 for adjusting the flow of fuel for the pilot burner. The pilot fuel outlet 19 is internally threaded to receive a compression nut or coupling sleeve for connecting the pilot fuel supply pipe 7 directly to the outlet 19 where a safety shut-off for the pilot burner is not required or for connecting the inlet 22 of the valve body 23 of the thermoelectric safety shut-off device for the pilot burner to the outlet 19 where 100% safety shut-off is desired.

Figure 1:
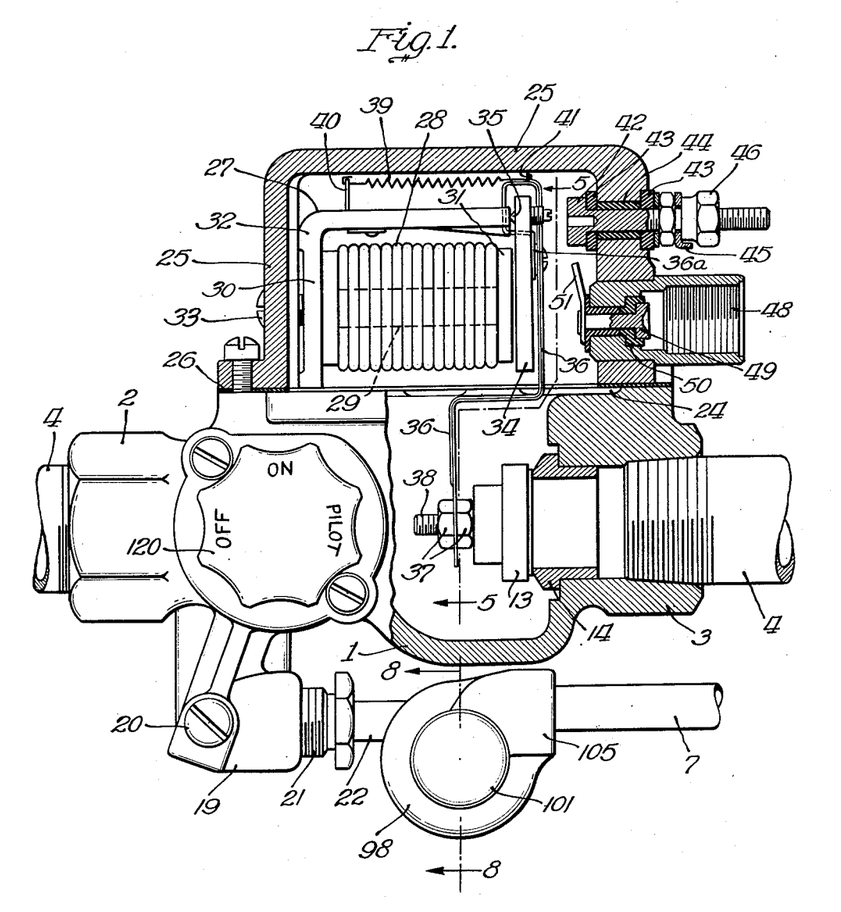
Figure 1 is a front elevational view of a space heater control assembly embodying the present invention with the valve body partially in section and the cover in section to reveal the main valve and the low power automatic operator therefor.

The valve body 1 has an opening 24 which is covered by a cover 25 preferably with a suitable gasket 26 therebetween. The cover 25 contains the low power electromagnetic operator 27 which comprises a coil 28 wound around a pair of core pieces 29 and between a pole piece 30 common to both core pieces 29 at one end and a pair of pole pieces 31 one at the opposite end of each core piece 29. The structure of the power unit of the electromagnetic operator particularly in respect of the pole pieces, core posts, movable armature, coil and thermocouple connected in circuit with the coil may be of the form more fully illustrated and described in the copending application of Adolph J. Hilgert, Serial No. 249,778, filed October 4, 1951, now Patent No. 2,790,937, and which makes very efficient utilization of available power. Suffice it for purposes of the present application to state that the core preferably has enlarged pole pieces provided with coaxial openings; that the core posts preferably have their opposite ends expanded into the openings and thereafter heat treated to deform and join the grains of metal so that the pole pieces and posts are in substantially one piece, that the coil is wound around the posts and between the pole pieces; that the movable armature is preferably at least equal in area to the pole faces of adjacent pole pieces; and that the thermocouple to be presently described is connected in circuit with the coil.

The assembly comprising the core pieces 29, coil 28 and pole pieces 30 is carried by one arm of an angular fulcrum bracket 32 which is secured, for example, by screws 33 to the cover 25. The armature 34 is pivoted by pointed screws 35 on the adjacent end of the other arm of the bracket 32 and carries a valve disc arm 36 which is secured to the armature 34 at 36a and may be formed of phosphor bronze or the like.

The arm 36 has a flexible spring section 36b which stores energy as will hereinafter be described during movement of the armature 34 toward the pole faces of the operator 27 upon energization thereof. The spring 36b is preferably in abutment with the pivotal points 35 of the armature 34, the upper end of the flexible section 36b providing effectively a fulcrum point for the remainder of the arm 36, which remainder is preferably rigid. Thus the pivotal points of both the armature 34 and arm 36 are preferably in alignment so that movement of the armature 34 does not cause lateral or other undesired displacement of the valve disc 13 carried by the arm 36. The arm 36 has an angular offset portion which extends into the valve chamber 12 and is connected by nuts 37 to the stem 38 of the valve member 13. The stem 38 preferably has a ball-like end 38a affording rocking movement of the valve disc 13 for self-alignment with the valve seat 14.

The valve member 13 is further provided with a facing 13a of rubber or other resilient material ground to a flat surface for presentation to the valve seat 14. This provides a better seal with less sealing force thereby permitting the power unit 27 to do more useful work in opening the valve.

A coiled spring 39 connected between a bracket or lug 40 on the bracket 32 and a lug 41 on the arm 36 to bias the valve member 13 to closed position and, in conjunction with the pressure of the fluid flowing through the valve, provide the necessary sealing force to prevent leakage of the valve. The spring 39 also provides force for overcoming the residual magnetism of the operator 27 upon deenergization thereof for retraction of the armature 34 and closure of the valve. It will at once become apparent that the force exerted by the spring 39 on the one hand must not be greater than the power available from the operator 27 when the armature 34 is being attracted or the valve cannot be opened; while, on the other hand, the force of the spring 39 must be great enough to overcome residual magnetism of the operator 27 upon deenergization thereof for closure of the valve, and great enough to provide necessary sealing force to the valve member 13 when in closed position. This is graphically illustrated in Figure 1b wherein the curve HI represents the magnetic pull on the armature in relation to armature air gap (measured at any convenient point between the armature 34 and the pole pieces 31, or their extended surfaces) which pull increases, as depicted, as the air gap decreases. If any restraining force on the armature is greater than the magnetic pull at any point of its travel, the armature cannot continue to move. The curve JK, on the other hand, represents the force necessary to push the armature 34 away from the pole faces 31 to overcome the residual magnetism of the iron of the power unit 27. Such force, it will be observed, also increases steeply with decreasing air gap, and becomes very great if the armature is allowed to seal against the pole pieces. The line C—D represents the force of the spring 39, which remains substantially constant while the armature travels from C to D. The value of this spring force, as aforementioned, must be greater than the residual magnetism JK to overcome such magnetism and afford necessary sealing force to the valve member 13, such sealing force being represented by the value of JC.

To reduce such residual magnetism special, but costly, low residual materials may be used with some success, but other means are provided in the present apparatus. Such means comprise first, means for maintaining a minimal air gap between the armature 34 and pole pieces 31 when the former is attracted. Such minimal air gap may be afforded by non-magnetic spacers or a mechanical stop, such as that shown in Figure 1A and comprising a member 160 attached to the frame 32 and extending therefrom up between the coils 28 and carrying at the outer end thereof a screw 161 threaded into the member 160 for adjustability of the minimum air gap. The screw 161 may coact directly with the armature 34 to provide a stop therefor for maintenance of minimal air gap, or may coact with a resilient spring member 162, hereinafter described, which may be carried by the armature 34.

Figure 1A:
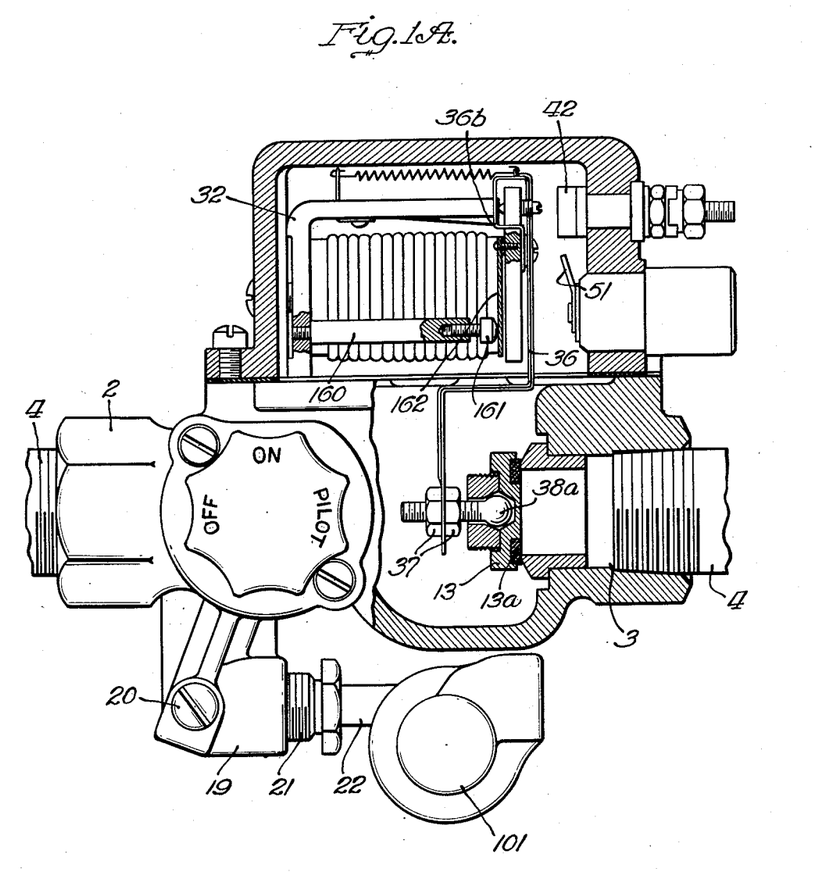
Figure 1A is a centerline sectional view of the operator shown in Figure 1 taken on the line 1A—1A of Figure 5.

The second means which may be provided for overcoming the force of residual magnetism of the operator 27 is the aforementioned resilient spring member 162 which is shown as carried by the armature 34. Energy imparted to this spring 162 during final movement of the armature 34 to attracted position is stored therein to be released when the operator 27 is deenergized to push the armature 34 away from the pole pieces 31 thereby providing an aid to the force of spring 39 in overcoming the residual magnetism of the operator. The spring 162 coacts with a stationary portion of the operator which may, as shown, be the stop screw 161, and when so arranged the spring 162 may be of thickness to provide the desired minimal air gap between the armature 34 and pole pieces 31. As will hereinafter appear, the addition of spring member 162 enhances the efficiency of the operator and thereby increases the available valve capacity.

Figure 11:
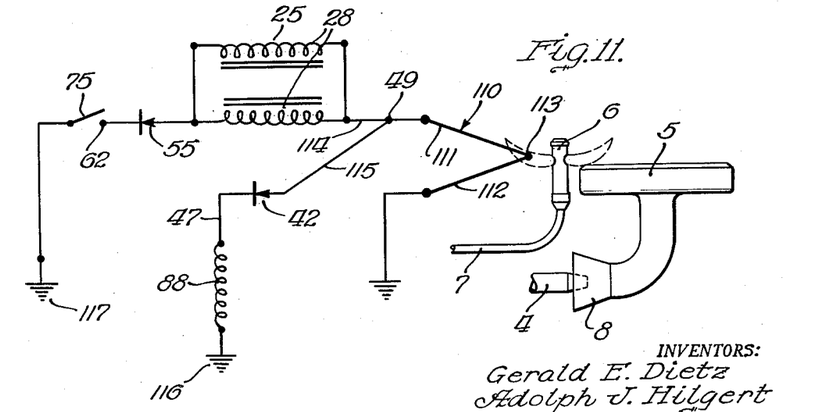
Figure 11 is a circuit diagram which includes a diagrammatic showing of the main burner and the pilot burner.

The aforedescribed valve operator is, as aforeindicated, powered by a single thermocouple 110, heated by a pilot burner 6 or the like, as shown in Figure 11, although a thermopile or other source of small electric energy may be employed. The thermocouple 110 comprises dissimilar thermocouple elements 111 and 112 joined at 113 to form a "hot" junction which is heated by the pilot burner flame. Opening through the wall of the cover 25 is a thermocouple terminal assembly comprising a conducting sleeve 48 grounded to the cover and a terminal stud 49 insulated from the sleeve 48 at 50 and provided at its inner end with a terminal bracket 51. As shown more or less diagrammatically in Figure 11, a conductor 114 completes the circuit to the coils 28 of the power unit 27, the other sides of which may be grounded to the cover 25.

Assuming the thermocouple 110 is generating electricity for supply to the valve operator through the aforedescribed circuit, the coils 28 will be energized and the armature 34 attracted to the pole pieces 31. Initial movement of the armature, however, does not immediately move valve member 13, but rather causes flexible spring section 36b of the arm 36 to be deformed or flexed. Only when armature travel has reduced the air gap to a point affording greater available magnetic pull and a point at which such pull and the force stored in the flexible section 36b of arm 36 is sufficient to overcome the sealing force of the valve member 13 is the latter put into motion and pulled away from the valve seat 14 with a snap, the energy stored in flexible section 36b being released.

During the latter part of armature 34 movement, the spring 162 engages the stop screw 161, movement of the armature to final attracted position storing energy in the spring 162. Upon deenergization of the coils 28, this stored energy is available, as aforementioned, to aid spring 39 in overcoming the residual magnetism of the power unit 27 and pushing the armature away from the pole pieces for seating of the valve member 13 against its seat 14.

Figure 1B:
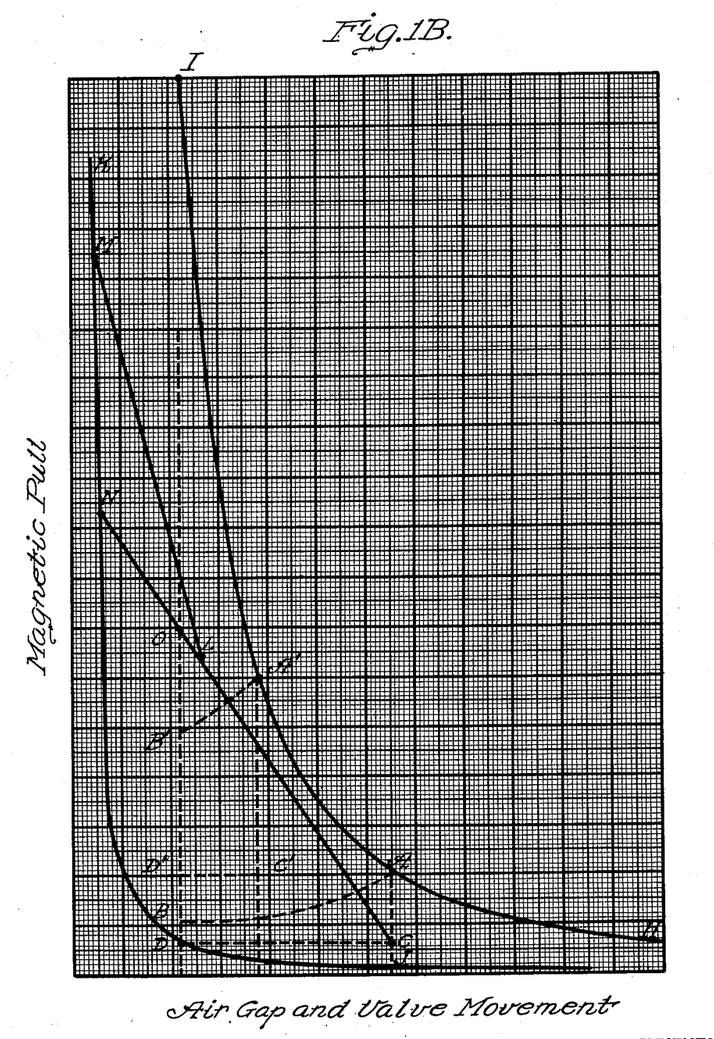
Figure 1B is a graphic representation of the performance characteristics of the electromagnetically operated valve embodying the present invention.

The increase in efficiency of the operator aforedescribed may best be explained by reference to Figure 1B, wherein, as aforementioned, the curve HI represents the relationship between magnetic pull of the power unit and armature air gap, curve JK represents the relationship between residual magnetic pull of the power unit and armature air gap, and the line CD represents the force of the spring 39, providing both the energy for overcoming such residual magnetism and, in conjunction with fluid pressure, the sealing force applied to the valve member 13, the latter force being represented by JC. Assuming for the moment that the arm 36 carrying the valve member 13 were rigid in its entirety and connected directly to the armature 34, the dotted line AB represents the force that the valve disc would exert on the armature 34 during valve opening, which decreases as the valve opens against fluid pressure. Point A on the curve represents the total force acting on the armature just before the valve opens and is made up of the fluid pressure acting on the valve member 13 and the force applied thereto by spring 39, both acting on the armature through arm 36. The force A can never be above the curve HI or the valve will not open. On the other hand, the force C representing the force of spring 39 must always be above the residual magnetism curve JK to close the valve, the force C, as indicated by the slope of line CD, remaining substantially constant with armature movement. It at once becomes apparent that work which can be done by the valve operator of this type in opening the valve against fluid pressure is represented by the area ACDB, and that the area CJD represents work done against the sealing force of spring 39. The total of these areas represents the total work done by the armature during valve opening. We have discovered that if point A is moved to the left along curve HI, for example to A', by attempting to use a larger diameter valve member and valve seat in order to increase the valve capacity, the valve movement is necessarily decreased and sealing force must be greater, resulting in a work area represented by A'C'D'B', which is substantially equal to the area ACDB and affords no greater valve capacity. In other words, the efficiency of the operator is not increased and no more of the work available below the curve HI is utilized. Valves of this type tested displayed a capacity of only around 10,000 B. t. u. when utilized to control flow of gaseous fuel. However, addition of the flexible spring energy storing section 36b to arm 36 aforedescribed greatly increased the efficiency of the operator and afforded valve capacity of about 32,000 B. t. u. The effect of such addition is depicted graphically in Figure 1B by the line CN whose slope is the spring rate of the flexible section 36b of arm 36. By storing energy in this flexible section during initial movement of the armature 34, the opening of the valve member 13 is delayed until a point represented by point O on line CN and the total work available in opening the valve is represented by the area CODJC, which, it will be observed, makes exceedingly greater use of the work available.

Further addition of the spring 162, in which energy is stored during final movement of the armature starting at a point represented by L on line CN further increases the efficiency of the unit by utilizing power which, as can be readily seen, is available at point L and beyond. The line LM represents the spring rate of the spring 162, the point M representing the minimal air gap value maintained by the stop screw 161. As will be apparent, this value is to the left of line DO representing the air gap which would have to be maintained if spring 39 alone were relied upon to overcome residual magnetism. The work used to store energy in spring 162 represented by area LMN, it will be observed, is available as excess work above line CN, which normally is not available to open the valve. The addition of spring 162 further increases the work area by addition thereto of the area represented by the area of DON and results in further increasing the valve capacity to about 38,000 B. t. u.

From the foregoing, it will be apparent that the present invention provides an electromagnetically operated valve of greatly increased efficient utilization of the power available, for example, from a single thermocouple, to afford the valve sufficient capacity for use in controlling flow of fluid fuel to the main burner of fluid fuel burning apparatus.

The fluid flow control apparatus thus far described may, if desired, be controlled by a condition responsive device, by placing such a device in series therewith in the thermoelectric circuit, as shown diagrammatically in Figure 11, wherein the contacts of the condition responsive device are designated by the reference numerals 62 and 75, the reference numeral 55 indicating an outwardly exposed terminal mounted in the wall of the cover 25 and insulated therefrom at 56.

It will be apparent, in view of the small amount of power available from the thermoelectric source of electric energy, any such condition or temperature responsive device utilized must, of necessity, be a device which utilizes a minimal amount of power. It, therefore, should be of low resistance and preferably should not include mechanical means such as, for example, snap action mechanism, which require power to actuate, nor should it include "anticipating" means which also require power. It should, nevertheless, afford high sensitivity and low differential.

Figure 3:
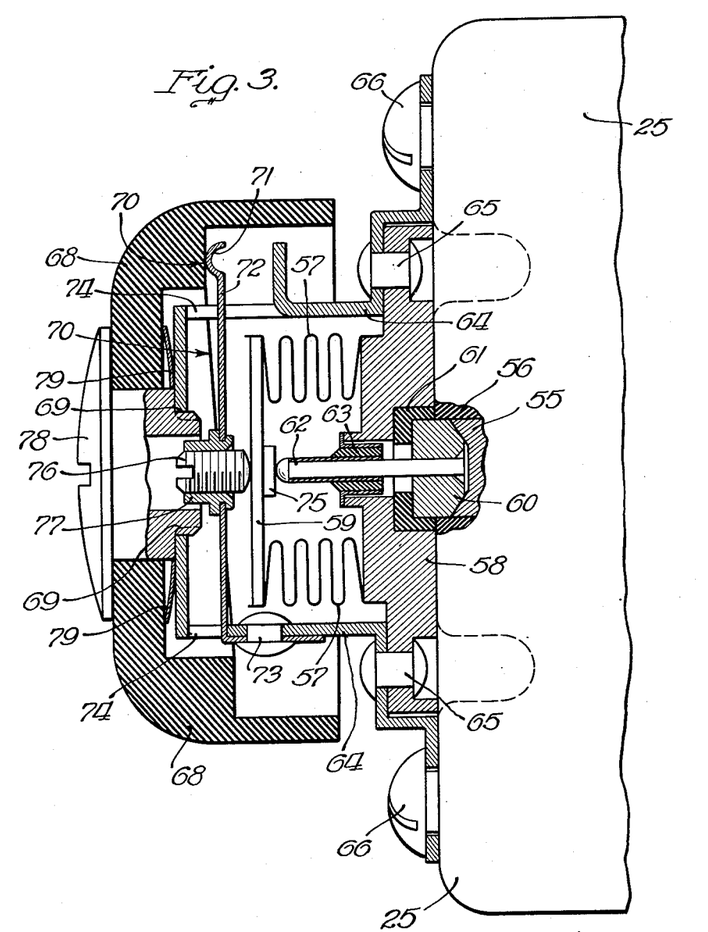
Figure 3 is a sectional view through the temperature responsive control device taken on the line 3—3 of Figure 2.

Such a device is shown in Figure 3, which is in the form of a temperature responsive device, in general, of the character more fully disclosed and claimed in the copending application of Adolph J. Hilgert, Serial No. 265,445, filed January 8, 1952, now Patent No. 2,719,201. This device comprises a hermetically sealed expansible and contractible bellows or enclosure 57 closed at one end by a fixed base plate 58 and at the opposite end by a movable end plate 59. A contact tip 60 insulated from the base plate 58 by an insulator 61 has a contact stem 62 which extends into the bellows 57 from its fixed end and has a rounded inner end forming one of the contacts within the bellows. The stem 62 is insulated from the base plate 58 by a glass insulator 63.

A bracket 64 has a generally U-shaped intermediate portion which straddles the bellows 57 in generally diametrical relation. The bracket 64 is secured to the base plate 58, for example, by rivets 65 and its outer ends are apertured to receive screws 66 or the like which fasten the bracket to the outer side of the cover 25 with the contact tip 60 in good electric contact with the terminal 55.

A dial or temperature adjusting knob 68 is mounted for rotation or turning movement in the bracket 64 at 69. The knob 68 has a cam surface 70 which is inclined and cooperates with the free end 71 of a spring lever 72 which extends diametrically across the movable end of the bellows 57. The opposite end of the spring lever 72 is fixed to the bracket 64, for example by a rivet 73. The bracket 64 has openings 74 through which the spring lever 72 extends. Within the bellows 57 and fixed to the movable end plate 59 at the axis thereof is a flat contact 75 which cooperates with the adjacent end of the contact stem 62. A factory adjustment screw 76 is screwed through a sleeve 77 fixed in the spring lever 72 in axial alignment with the contact 75 for factory adjustment of the device. The inner end of the bearing screw 78 which carries the knob 68 may be hollow as shown to telescope over the screw 76 to render the same readily accessible. A spring washer 79 is interposed between the knob 68 and the bracket 64.

The bellows 57 is filled with a volatile fluid whose vapor pressure increases and decreases upon rise and drop in ambient temperature, for example, the temperature of the air in a room or space or the temperature of any other medium in which the thermostat is disposed. Reference is directed to the copending application of Adolph J.

Hilgert, Serial No. 265,445, filed January 8, 1952, now Patent No. 2,719,201, for suitable fills for filling the bellows 57 but it is to be understood that other fills may be employed. Illustrative of the fills mentioned in the foregoing copending application are butane (which is a colorless gaseous compound—$C_4H_{10}$—of the aliphatic hydrocarbon or marsh-gas series), which at 70° F. will exert a pressure of approximately 31 pounds per square inch; isobutane, which at 70° F. will exert a pressure of approximately 45 pounds per square inch; sulphur dioxide ($SO_2$) which at 70° F. will exert a pressure of approximately 50 pounds per square inch; methyl chloride ($CH_3Cl$), which at 70° F. will exert a pressure of approximately 72 pounds per square inch; "F–12" or Freon ($CCl_3F_3$) which at 70° F. will exert a pressure of approximately 85 pounds per square inch; and propane ($C_2H_8$), which at 70° F. will exert a pressure of approximately 120 pounds per square inch. The contacts 62 and 75 are thereby at all times immersed and bathed in the volatile fluid and kept clean and out of contact with surrounding atmospheric conditions so that they will not be deleteriously affected thereby.

The temperature responsive device with its enclosed contacts 62 and 75 immersed in a volatile fill provides slow-make, slow-break contacts in the thermoelectric circuit and as utilized in the apparatus of the present application may function as a variable resistance in the thermoelectric circuit, since in view of the small electric energy involved, the thermoelectric circuit and hence the electromagnetically controlled valve 13 may be automatically controlled responsive to changes in temperature by merely varying the contact pressure of the contact 75 against the contact 62. Even if the circuit actually had to be opened to cause the electromagnetic control device to drop out, the slow-make, slow-break characteristics will afford certain differential advantages. The enclosed contacts immersed in the volatile fill within the bellows or enclosure on one hand, by protecting the contacts and preventing oxides or other layers tending to create contact resistance, make actuation of the electromagnetic control device by the lower power circuit possible, while on the other hand, the lower power circuit (which eliminates arcing at the contacts when opened or when at low contact pressure permits drop-out of the electromagnetic control device), makes possible the enclosure of the contacts within the bellows or enclosure without breaking down the volatile fill.

All of the foregoing adds up to an apparatus in which the differential required to pick-up and drop-out the electromagnetic control device, neglecting thermal lag of the temperature responsive means, is dependent solely upon the electric constants of the apparatus, that is, the pick-up and drop-out values of the electromagnetic control device in relation to the contact pressure in the condition responsive means. The inherent differential is so minimal as to be within the thermal lag range of the temperature responsive device which in and of itself is much lower than in previously known devices. This is so because this differential is an electrical and not a mechanical one, as for example, inherent in snap-acting temperature responsive means necessary where higher powered circuits are involved and contacts must be broken quickly to minimize arcing. In the latter type of device, the differential not only includes manufacturing tolerances in the mechanism but also an air gap between the contacts which varies as the contacts wear in use. Moreover, in such devices additional electric energy is necessary to supply the force necessary to overcome the snap mechanism and to power "anticipating" means which must be utilized if the apparatus is to have the required sensitivity. Such extra energy is not available from a thermocouple supplied low power circuit; but, on the other hand, such low power eliminates the necessity for snap-acting means. The apparatus of the present application affords great sensitivity and quickness in response, and provides a minimal differential which remains constant throughout the life of the device.

The present apparatus requires only minimal pressure changes for operation and therefore permits the use of volatile fills having, for example, at normal room temperatures a pressure below atmospheric pressure (these fills have lower pressure changes per degree temperature than higher pressure fills) whereby, if a leak occurs, to increase the resistance of the circuit to a value at which the electromagnetic operator is deenergized so that the valve will close and shut off the flow of fuel.

Reference is directed to the copending application of John A. Wolff, Serial No. 266,626, filed January 16, 1952, now Patent No. 2,719,202, for suitable sub-atmospheric fills for the bellows or enclosure for the contacts 62, 75. Illustrative of the sub-atmospheric fills mentioned in this latter copending application are ether, methylene chloride, trichloro trifluoro ethane and isopentane; also isopropyl alcohol, for example, for 180° F. maximum setting, N-propyl alcohol for a 200° F. maximum setting, isobutyl alcohol for a 220° F. maximum setting, N-butyl alcohol for a 240° F. maximum setting, isoamyl alcohol for a 260° F. maximum setting, M-xylene for a 280° F. maximum setting, or P-cymene for a 330° F. maximum setting.

The inherent differential required to pick-up and drop-out the electromagnetic control device is not only minimal and constant over the life of the apparatus but is easy to maintain from apparatus to apparatus in production since the pick-up and drop-out values of the electromagnetic control device are easily maintained and calibrated. Moreover, the temperature differential of the apparatus (neglecting negligible rate of change of vapor pressure throughout the operating temperature range) remains constant through the operating temperature range since the differential is independent of the relative position of the contacts and is dependent only upon contact resistance as determined by contact pressure in relation to the inherent differential of the electromagnetic control device. The encapsulation of the contacts inside the bellows or enclosure assures constant resistance for given contact pressures and thus the temperature responsive means aside from the thermal lag therein does not contribute to the temperature differential and the contact resistance if variable at all merely shifts the range of the device which may be automatically adjusted, for example, by the factory range adjustment 76.

Where shut-off of the flow of fuel to the pilot burner 6 upon failure thereof is desired, a separate thermoelectric safety shut-off may be provided. This shut-off need be only of small capacity, since it controls flow of fuel to the pilot burner only, and hence, in view of the increased efficient use of the thermocouple power made possible by the electromagnetically operated main burner valve previously described, can be powered from the same thermocouple. For this purpose a terminal post 42 is provided, which post extends through an opening in the cover 25 and is insulated therefrom by suitable insulating gaskets 43 and an insulating sleeve 44. The outer end of this post has a terminal washer 45 and a terminal nut 46 for clamping thereto a conductor 47 (Figure 11) which leads to the coil 88 of the thermoelectric safety shut-off device for the pilot burner. As shown in Figure 11, this device is connected electrically in parallel with the main burner valve operator 27.

Figure 9:
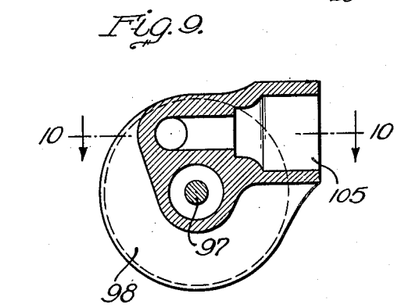
Figure 9 is a detail section taken on the line 9—9 of Figure 8.
Figure 10:
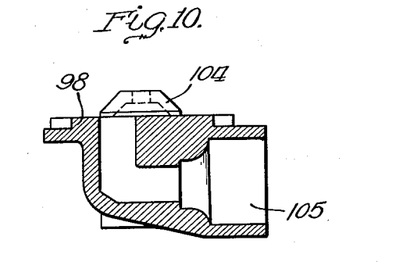
Figure 10 is a detail section taken on the line 10—10 of Figure 9.

The thermoelectric safety valve for shutting off the flow of fuel to the pilot burner 6 when it is extinguished to provide 100% shut-off where desired is preferably of the type disclosed and claimed in the copending application of Gerald E. Dietz, Serial No. 296,831, filed July 2, 1952, which may comprise, as shown in detail in Figures 8–10, a valve body 23 which has an internal transverse wall 80 provided with an axial port 81 affording communication between an inlet chamber 82 on one side of the wall 80 and an outlet chamber 83 at the opposite side of this wall.

Figure 8:
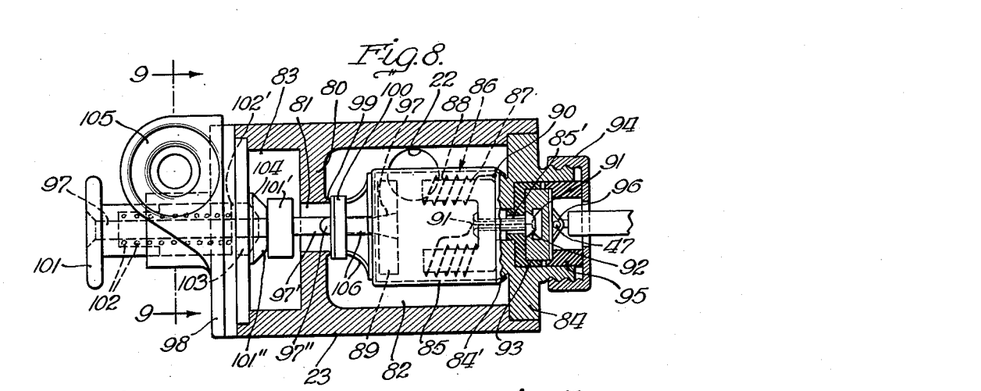
Figure 8 is a longitudinal axial section through the safety shut-off valve for the pilot burner.

The outer end of the chamber 82 is closed by a terminal bushing 84 secured in the end of the valve body 23. An electromagnet and armature cup 85 is secured to the inner side of the bushing 84, for example, by spinning it over into engagement with the bushing at 84'. The cup 85 which is disposed in the chamber 82 encloses an electromagnet 86 comprising a U-shaped magnet frame 87 and a coil 88 wound around the legs thereof; also an armature 89. One end of the coil 88 is grounded, for example, at 90 to the bushing 84 and the opposite end of the coil 88 extends out through the bushing 84 being insulated therefrom at 85' and connected at 91 to a terminal tip 92. The tip 92 is insulated from the bushing 84 by an insulating sleeve 93. A terminal bushing nut 94 is screwed on the bushing 84 and an insulating ring 95 is interposed between it and the terminal tip 92. A suitable connector is provided at 96 for connecting the conductor 47 to the terminal tip 92 to place this tip in circuit with the terminal post 42 where desired.

The armature 89 is mounted preferably for relative movement on the inner end of an armature stem 97 which extends for reciprocatory movement out through the adjacent end wall of the cup 85 and is connected to the shut-off valve member 100. A reset stem 97' coacts with a rivet 97'' carried by the valve member 100 and extends for reciprocatory movement out through a cover 98 which has, for example, pressed fit in the valve body 23 at the outer end of the chamber 83. The port 81 has a valve seat 99 at its inlet chamber end and the stem 97 carries the shut-off valve member 100 which seats against the seat 99 to shut off the flow of fuel to the pilot burner 6 when its flame is extinguished. The outer end of the reset stem 97' is provided with a reset button 101 and a spring 102 coiled about the stem 97 and interposed between the button 101 and washer 102 acts to move the reset stem 97' to retracted position and a sealing valve member 101' to closed position against a seat 101'' with movement of the shut-off valve member 100 against its seat 99 when the electromagnet 86 is deenergized sufficiently upon extinguishment of the pilot burner flame to release the armature. Packing 103 is interposed between the washer 102' and the adjacent inwardly tapered portion 104 of the cover 98.

The cover 98 has an outlet 105 for connection to the pilot fuel supply pipe 7 for supplying fuel to the pilot burner 6. Where 100% shut-off is not necessary, the safety shut-off for the pilot fuel supply is merely removed from the valve body 1 by unscrewing the compression or coupling nut 21 from the outlet 19 and the pilot fuel supply pipe 7 is connected directly to the outlet 19. A spring 106 is carried by the valve member 100 for cooperation with the adjacent end wall of the cup 85 (i. e., the end wall through which the stem 97 reciprocates) when the armature is in attracted position. In this position the spring 106 is tensioned so as to actuate the pilot fuel shut-off valve member 100 to closed position and the armature 89 to retracted position when the electromagnet 86 is deenergized.

The automatic electromagnetic operator 27 for the main valve 13, and where the safety shut-off valve for the pilot burner fuel is employed, the electromagnet 86, are as aforementioned, both adapted to be powered by a single thermocouple 110 as shown in Figure 11 although a thermopile or other source of small electric energy may be employed. The thermocouple 110 comprises dissimilar thermocouple elements 111 and 112 joined at 113 to form a "hot" junction which is heated by the pilot burner flame.

As shown more or less diagrammatically in Figure 11, the electric circuit is from the thermocouple element 111 to the terminal study 49 and through a conductor 114 and the coil 28 of the electromagnetic operator 25 to the terminal 55; also through the conductor 115 to the terminal post 42 and through the conductor 47 to the coil 88 of the safety shut-off for the pilot burner and to ground at 116. The circuit for the terminal 55 is through the terminal tip 60 and thermostat contacts 62 and 75 to ground at 117. The other thermocouple element 112 is grounded at 118.

The operation of the aforedescribed embodiment of the invention is as follows:

Gas enters at 2 and with the gas cock 10 turned by the finger piece 120 to a pilot position the port 16 is in register with the inlet 2 which allows gas to flow through the gas cock passage 17 to the back of the control and through passage 18 to the pilot fuel outlet 19. With the button 101 manually pressed inwardly, the gas passes into the chamber 82 and thence through port 81, chamber 83, outlet 105 and pilot fuel supply pipe 7 to the pilot burner 6 where it is ignited. Upon energization of the electromagnet 86 by the heat of the pilot burner flame on the thermocouple 110, the armature 89 is held attracted to the electromagnet with the valve member 100 in open position and reset button 101 may be released.

When the temperature, for example, of the air or other medium surrounding the bellows 57 falls below that set, for example, by the cam surface 70 of the knob 68, the bellows 57 contracts under the influence of the loading spring arm 72. The contact 75 gradually closes against contact 62 and the contact pressure builds up, for example, from about 0 pound pressure to at least the pressure where the resistance of the thermocouple circuit is reduced to a value at which the electromagnetic operator 27 is energized by the thermoelectric current from the thermocouple 110 and actuates the armature 34 to attracted position to actuate the valve member 13 to open position as previously described. With, for example, silver contacts, a contact pressure of only a few grams reduces the contact resistance to a very low value. The relation between contact pressure and contact resistance will vary for different shapes of contacts and for various contact materials.

Upon rise of the order of a few tenths of a degree Fahrenheit or less in the temperature at the temperature responsive means above that set by the cam surface 70 of the knob 68, the bellows 57 expands and reduces the pressure of the contact 75 against the contact 72 at least to where the resistance of the thermocouple circuit is increased to a value where the electromagnetic operator 27 is deenergized and the valve 13 is actuated to closed position as previously described.

If at any time the flame of the pilot burner 6, which normally should burn constantly, becomes extinguished, thereby creating an unsafe condition, the thermocouple 110 will be deenergized and the flow of energizing thermoelectric current in the electromagnetic operator 27 and in the electromagnet 86 of the pilot fuel shut-off device, where such device is employed, will be discontinued. When this occurs both the main valve 13 and the pilot valve 100 move to closed position to provide 100% shut-off of the fuel.

Figures 2, 4:
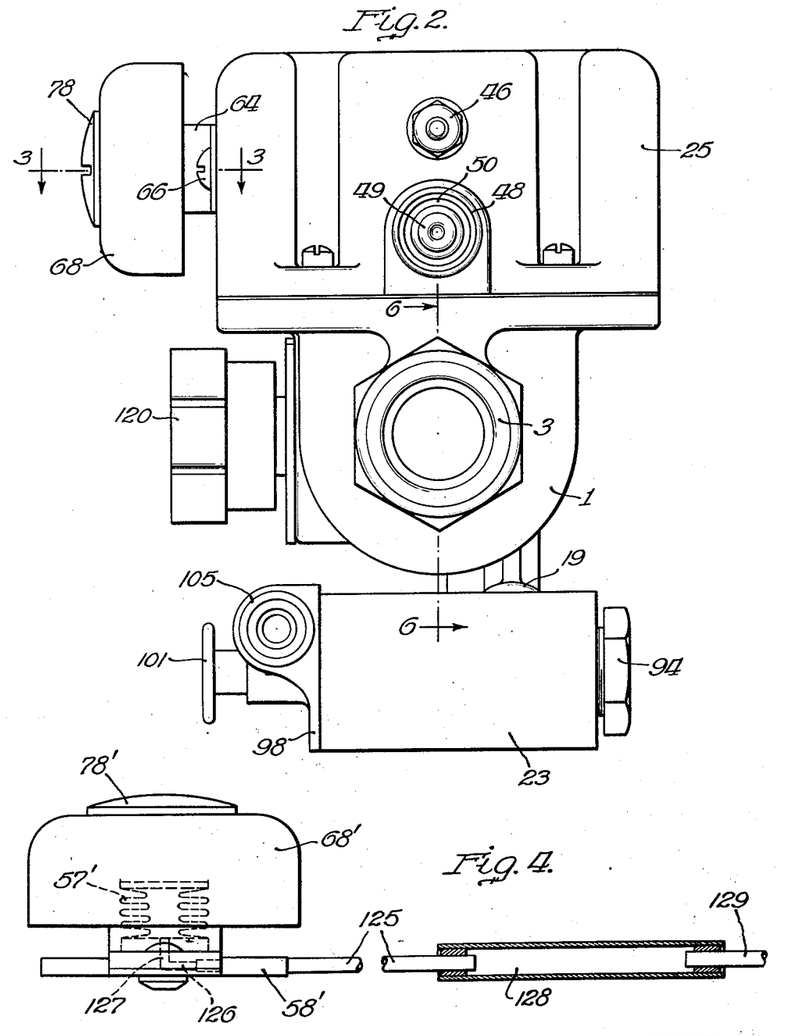
Figure 2 is an end view of the assembly looking toward the left-hand end of Figure 1.
Figure 4 is a view showing the temperature responsive control device in elevation with a remote temperature sensing bulb applied thereto.
Figures 12, 13:
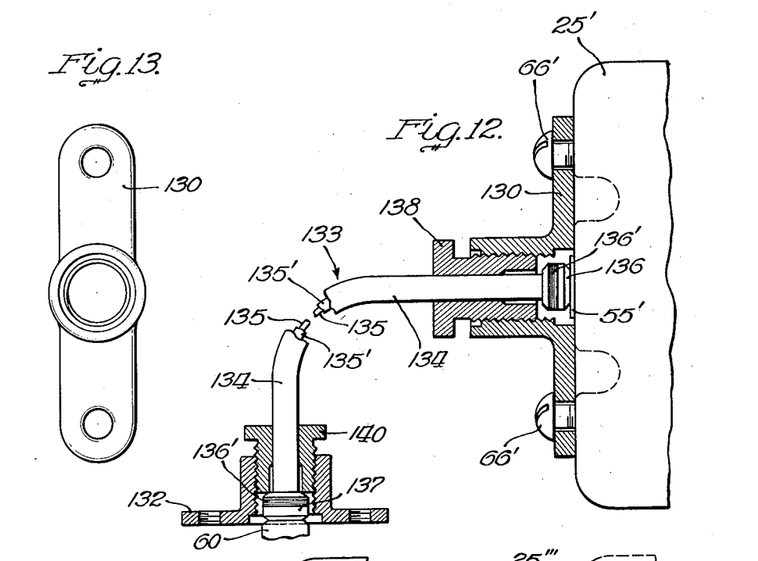
Figure 12 is a view similar to Figure 3 showing an adapter substituted for the temperature responsive control device of Figure 3 for separating the temperature responsive control from the valve body.
Figure 13 is a front view of the plate of the adapter shown in Figure 12.

The temperature setting of the thermostat is achieved by turning the knob 68 to vary by the cam surface 70 the pressure applied to the bellows 57 by the spring 72, and free end of which has wiping contact with the cam surface 70.

Where it is desired to make the thermostat responsive to variations in temperature at a remote location, a capillary tube 125 of a length to extend to the desired position may be inserted into the base plate 58' as shown in Figure 4 into position opening through passages 126 and 127 in the base plate into the interior of the bellows 57'. The opposite end of the tube 125 opens into one end of a temperature sensing bulb 128 which may be positioned at the desired remote location. A fill tube 129 opens into the opposite end of the bulb 128 for filling the bulb 128, capillary tube 125 and bellows 57' with the desired volatile fluid.

Where it is desired to separate the thermostat from the valve body, for example, to place the temperature control knob on the front of the heater and the valve at the back of the heater an adapter is provided as shown in Figures 12 and 13. This adapter comprises a plate 130 for attachment to the cover 25' by screws 66' in place of the base plate 58 shown in Figure 3. A thermostat mounting plate 132 is adapted for attachment, for example, to the base plate 58 of the thermostat shown in Figure 3.

The plates 130 and 132 have integral sleeve portions into which the opposite ends of a coaxial lead conductor 133 extend. The coaxial conductor 133 comprises an outer tubular lead conductor 134 and a coaxial inner lead conductor 135 the latter being preferably covered with insulation 135' to insulate it from the outer conductor. The opposite ends of the inner conductor 135 extend from the ends of the outer conductor and carry terminal tips 136 and 137 which are insulated by insulation 136' from the adjacent ends of the outer conductor. A nut 138 screwed into the sleeve portion of the plate 130 clamps the terminal tip 136 in contact with the contact terminal 55' on the valve cover 25' and a second nut 140 clamps the terminal tip 136 in contact with the contact tip 60 of the thermostat.

Figure 14:
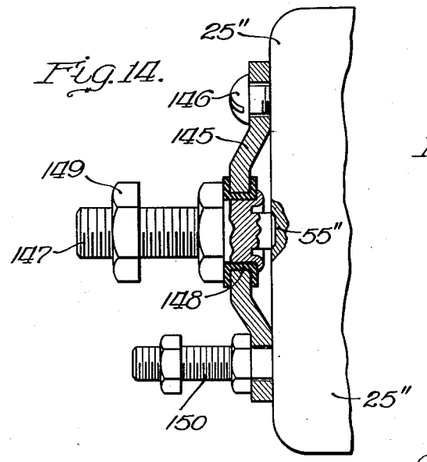
Figure 14 is a view similar to Figure 3 showing another form of adapter for connecting to a wall mounted room thermostat.

If it is desired to connect the electromagnetic operator in circuit, for example, with a room thermostat that may be mounted on the wall of a room, a mounting plate 145 may be attached to the cover 25" by a screw 146 as shown in Figure 14. This plate 145 carries a contact stud 147 which is insulated from the plate by insulation 148. With the plate applied to the cover 25", the inner end of the stud 147 contacts the contact terminal 55" on the valve cover. A nut 149 is screwed on the outer end of the stud for connecting one thermostat conductor to the stud. The plate 145 carries a second stud 150 in circuit therewith and a nut 151 is screwed on this stud for connecting another conductor thereto.

Figure 15:
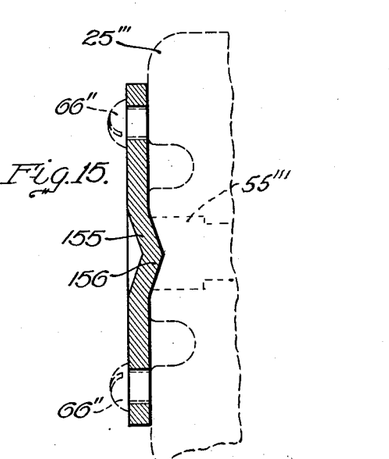
Figure 15 is a view similar to Figure 3 showing a shorting bar applied to the valve body in place of the thermostat.

If it is desired to operate the control as an automatic safety shut-off without the thermostat, the thermostat may be removed and a shorting bar 155 attached to the cover 25''' by screws 66" as shown in Figure 15. This bar 155 has an indentation 156 which when thus applied contacts the contact terminal on the cover 25''' and shorts the circuit by grounding this terminal to the cover.

The embodiments of the invention shown in the drawings are for illustrative purposes only and it is to be expressly understood that said drawings and the accompanying specification are not to be construed as a definition of the limits or scope of the invention, reference being had to the appended claims for that purpose.

We claim:

1. Means for increasing the work available from an electromagnetic operator having an armature and a power unit energized from a source of electric energy of given power comprising means for storing energy imparted by initial movement of said armature to attracted position for release to perform work during a later stage of said attractive movement when the air gap of said armature is reduced to a value approaching that which affords maximum magnetic attraction, and a spring coacting with said armature and in which energy is stored by final movement only of said armature to attracted position for release upon deenergization of said power unit to impart movement of said armature to retracted position in opposition to the residual magnetism of said power unit and independently of said first-mentioned energy storing means.

2. Means for increasing the work available from an electromagnetic operator having an armature and a power unit energized from a source of electric energy of given power comprising means for storing energy imparted by initial movement of said armature to attracted position for release to perform work during a later stage of said attractive movement when the air gap of said armature is reduced to a value approaching that which affords maximum magnetic attraction, and second means in which energy is stored by final movement only of said armature to attracted position for release upon deenergization of said power unit to impart movement of said armature to retracted position in opposition to the residual magnetism of said power unit and independently of said first-mentioned energy storing means.

3. Means for increasing the work available from an electromagnetic operator having an armature and a power unit energized from a source of electric energy of given power comprising an arm having a flexible section for storing energy imparted by initial movement of said armature to attracted position for release to perform work during a later stage of said attractive movement when the air gap of said armature is reduced to a value approaching that which affords maximum magnetic attraction, means for maintaining a minimum armature air gap to reduce the effect upon said armature of residual magnetism of said power unit when deenergized, and second means in which energy is stored by final movement only of said armature to attracted position for release upon deenergization of said power unit to impart movement of said armature to retracted position in opposition to the residual magnetism of said power unit and independently of said first-mentioned energy storing means.

4. A self-actuating safety shut-off for fluid fuel burning apparatus having a main burner and an ignition burner comprising, in combination, a valve engageable with a seat for controlling flow of fuel to said apparatus, means biasing said valve toward said seat to supply substantial sealing force to said valve independent of the fuel controlled thereby, an electromagnetic operator for said valve comprising an electromagnet and an armature, means biasing said armature to retracted position, connections between said armature and said valve affording actuation of the valve to an open position against said biasing means when said armature is attracted to said electromagnet, said connections including first means for storing energy imparted by initial movement of said armature to attracted position to delay transmission of said movement to said valve until the armature air gap is reduced to a value approaching that which affords maximum magnetic attraction, second means in which energy is stored by final movement only of said armature to attracted position for release upon deenergization of said power unit to impart movement of said armature to retracted position in opposition to the residual magnetism of said power unit and independently of said first energy storing means, and a source of electric energy constituting the sole energizing source for energizing said electromagnetic operator comprising a thermocouple subject to the heat of said ignition burner, whereby when said ignition burner is lit said electromagnetic operator effects opening of said valve, and if said ignition burner fails said operator effects closure of said valve.

5. Apparatus for controlling flow of fuel to fluid fuel burning apparatus having a main burner and an ignition burner comprising, in combination, a self-actuating safety shut-off valve coacting with a valve seat for controlling flow of fuel to said main burner, means biasing said valve toward said seat to supply substantial sealing force to said valve independent of the fuel controlled thereby, a source of electric energy comprising a thermoelectric generator subject to the heat of said ignition burner, an electromagnetic operator for said valve energized solely by said electric energy and adapted when so energized to actuate said valve to open position against said biasing means and when deenergized to permit movement of said valve to closed position under said bias, said electromagnetic operator comprising an electromagnet and an armature, means biasing said armature to retracted position, connections between said armature and said valve affording actuation of the valve when said armature is attracted to said electromagnet, said connections including first means for storing energy imparted by initial movement of said armature to attracted position to delay transmission of said movement to said valve member until the armature air gap is reduced to a value approaching that which affords maximum magnetic attraction, second means in which energy is stored by final movement only of said armature to attracted position for release upon deenergization of said power unit to impart movement of said armature to retracted position in opposition to the residual magnetism of said power unit and independently of said first energy storing means, and condition responsive means in circuit with said electromagnetic operator to control actuation of said valve in response to changes in the condition, said condition responsive means comprising an enclosure expansible and contractible with changes in said condition and cooperating low resistance contacts carried by said enclosure and movable directly and continuously therewith for control of said circuit.

6. An electromagnetically operated valve adapted to be energized from a low power source of electric energy comprising, a power unit including an armature pivotally mounted for movement from a retracted position to an attracted position by energization of said power unit, a valve member coacting with and biased toward a seat offset laterally from said armature pivot, and a valve arm carrying said valve member and connected to said armature for imparting movement of the armature to said valve member, said arm having a resilient portion for storing energy imparted by initial movement of said armature to attracted position, said resilient portion affording a hinge for movement of said valve member relative to said armature, and said resilient portion also being positioned so that the hinge axis afforded thereby is substantially coincident with the pivot axis of said armature, whereby to avoid lateral movement of said valve member on its seat during the aforementioned storage of energy in said resilient valve arm portion.

7. Means for increasing the work available from an electromagnetic operator having an armature and a power unit energized from a source of electric energy of given power comprising means for storing energy imparted by initial movement of said armature to attracted position for release to perform work during a later stage of said attractive movement when the air gap of said armature is reduced to a value approaching that which affords maximum magnetic attraction, and second means in which energy is stored by movement of said armature during said later stage only to attracted position for release upon deenergization of said power unit to impart movement of said armature to retracted position in opposition to the residual magnetism of said power unit and independently of said first mentioned energy storing means.

8. An electromagnetically operated control device adapted to be energized from a source of electric energy comprising, a power unit including an armature pivotally mounted for movement from a retracted position to an attracted position by energization of said power unit, a movable control member coacting with and biased toward a stationary control member offset laterally from said armature pivot, and an actuating arm carrying said movable control member and connected to said armature for imparting movement of the armature to said movable control member, said arm having a resilient portion for storing energy imparted by initial movement of said armature to attracted position, said resilient portion affording a hinge for movement of said movable control member relative to said armature, and said resilient portion also being positioned so that the hinge axis afforded thereby is substantially coincident with the pivot axis of said armature, whereby to avoid lateral movement of said movable control member with respect to said stationary control member during the aforementioned storage of energy in said resilient actuating arm portion.

9. An electromagnetically operated control device adapted to be energized from a source of electric energy comprising, a power unit including an armature pivotally mounted for movement from a retracted position to an attracted position by energization of said power unit, means in which energy is stored by final movement of said armature to attracted position for release upon deenergization of said power unit to impart movement of said armature to retracted position in opposition to the residual magnetism of said power unit, a movable control member coacting with and biased toward a stationary control member offset laterally from said armature pivot, and an actuating arm carrying said movable control member and connected to said armature for imparting movement of the armature to said movable control member, said arm having a resilient portion for storing energy imparted by initial movement of said armature to attracted position, said resilient portion affording a hinge for movement of said movable control member relative to said armature, and said resilient portion also being positioned so that the hinge axis afforded thereby is substantially coincident with the pivot axis of said armature, whereby to avoid lateral movement of said movable control member with respect to said stationary control member during the aforementioned storage of energy in said resilient actuating arm portion.

10. A self-actuating flow control device comprising, in combination, a valve engageable with a valve seat for controlling flow of fluid, an electromagnetic operator for said valve comprising an electromagnet and a pivotally mounted armature, means biasing said armature toward retracted position, an actuating arm carrying said valve and connected to said armature for imparting movement of the armature to said valve, said actuating arm having a resilient portion affording a hinge for movement of said valve relative to said armature and for storing energy imparted by initial movement of the armature to attracted position, said resilient portion also being positioned so that the hinge axis afforded thereby is substantially coincident with the pivot axis of said armature to avoid lateral movement of said valve with respect to said valve seat during storage of energy in said resilient actuating arm portion, means in which energy is stored by final movement of said armature to attractive position for release upon deenergization of said power unit to impart movement of said armature to retracted position in opposition to the residual magnetism of said power unit.

11. A self-actuating safety shut-off for fluid fuel burning apparatus having a main burner and an ignition burner comprising, in combination, a valve engageable with a seat for controlling flow of fuel to said apparatus, an electromagnetic operator for said valve comprising an electromagnet and a pivotally mounted armature, means biasing said armature to retracted position, an actuating arm carrying said valve and connected to said armature for imparting movement of the armature to said valve, said actuating arm having a resilient portion affording a hinge for movement of said valve relative to said armature and for storing energy imparted by initial movement of the armature to attracted position for release to perform work during a later stage of said attractive movement when the air gap of said armature is reduced to a value approaching that which affords maximum magnetic attraction, said resilient portion also being positioned so that the hinge axis afforded thereby is substantially coincidental with the pivot axis of said armature to avoid lateral movement of said valve with respect to said valve seat during storage of energy in said resilient actuating arm portion, means in which energy is stored by final movement of said armature to attracted position for release upon deenergization of said power unit to impart movement of said armature to retracted position in opposition to the residual magnetism of said power unit, and a source of electric energy for energizing said electromagnetic operator comprising a thermoelectric generator subject to the heat of burning fuel at said ignition burner, whereby on burning of fuel at said ignition burner said electromagnetic operator effects opening of said valve, and on failure of said ignition burner said operator effects closure of said valve.

References Cited in the file of this patent

UNITED STATES PATENTS

| Number | Name | Date |
|---|---|---|
| 360,823 | Singer | Apr. 5, 1887 |
| 1,109,996 | Kuhlmann | Sept. 8, 1914 |
| 1,206,699 | Harthan | Nov. 28, 1916 |
| 1,605,824 | Erickson | Nov. 2, 1926 |
| 1,673,923 | Snyder | June 19, 1928 |
| 2,217,785 | Betz | Oct. 15, 1940 |
| 2,274,938 | Ray | Mar. 3, 1942 |
| 2,291,567 | Wunsch | July 28, 1942 |
| 2,294,694 | Ray | Sept. 1, 1942 |
| 2,349,443 | McCarty | May 23, 1944 |
| 2,353,042 | Koch | July 4, 1944 |
| 2,584,711 | Jones | Feb. 5, 1952 |
| 2,596,409 | Johnson | May 13, 1952 |